Feb. 5, 1929.                                            1,701,413
A. R. LEWELLEN
INSTRUMENT MOUNTING
Filed March 13, 1925            2 Sheets-Sheet 1

INVENTOR
Albert R. Lewellen
BY
Blackmore, Spencer & Flint
ATTORNEY

Feb. 5, 1929.
A. R. LEWELLEN
1,701,413
INSTRUMENT MOUNTING
Filed March 13, 1925      2 Sheets-Sheet 2
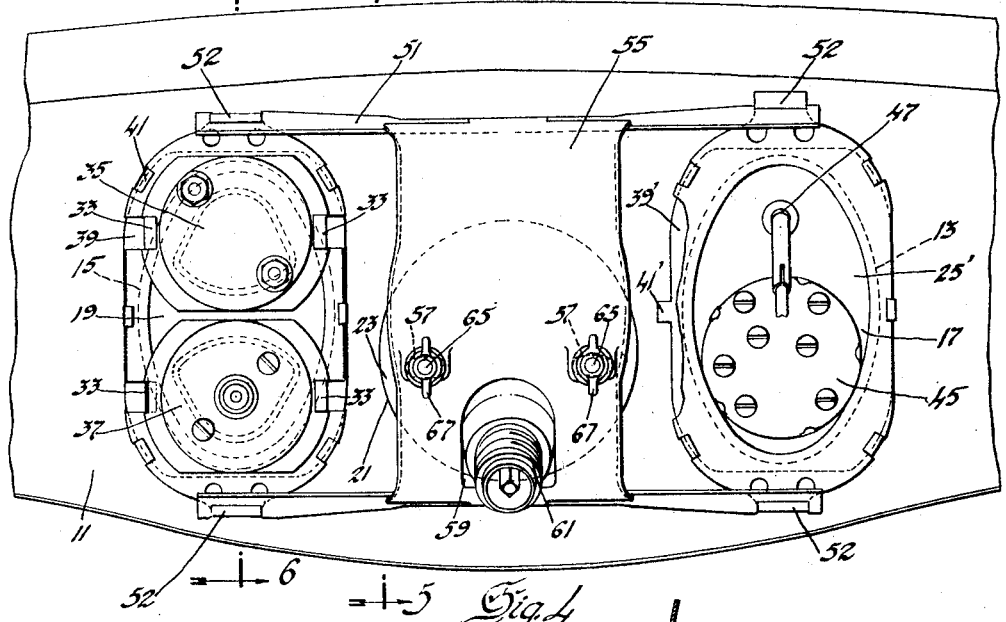
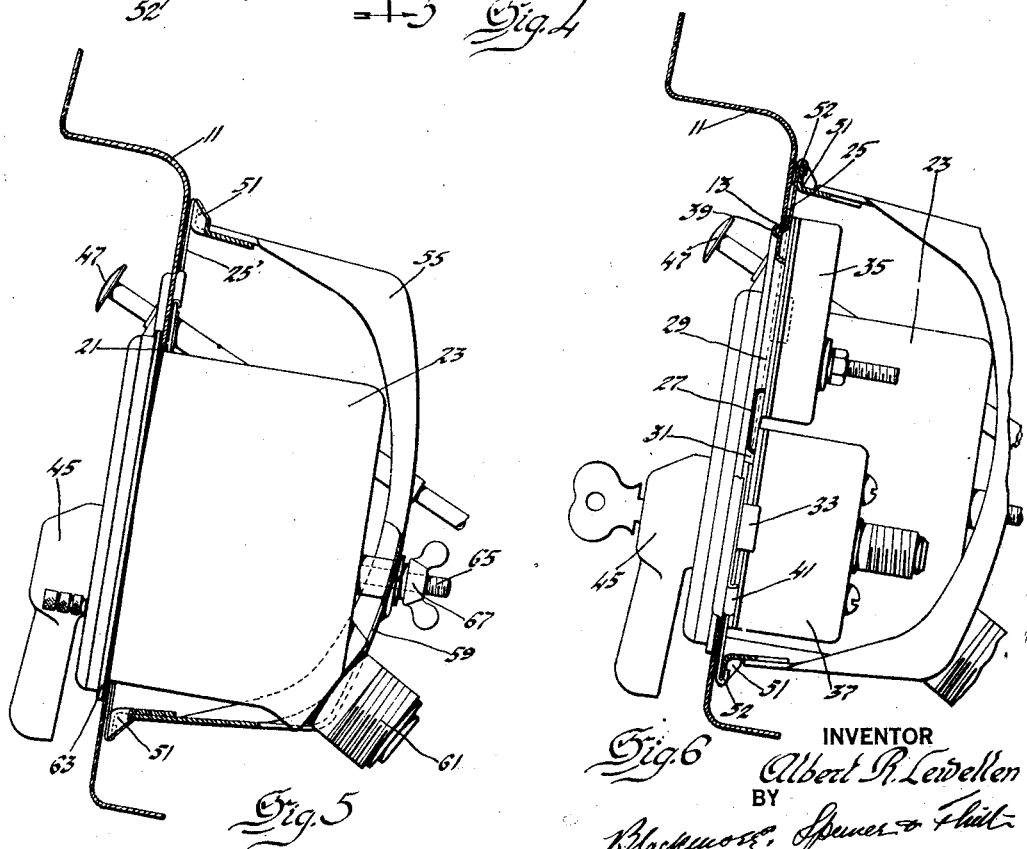
INVENTOR
Albert R. Lewellen
BY
Blackmore, Spencer & Hrill
ATTORNEY Patented Feb. 5, 1929.

1,701,413

UNITED STATES PATENT OFFICE.

ALBERT R. LEWELLEN, OF DETROIT, MICHIGAN, ASSIGNOR TO GENERAL MOTORS CORPORATION, OF DETROIT, MICHIGAN, A CORPORATION OF DELAWARE.

INSTRUMENT MOUNTING.

Application filed March 13, 1925. Serial No. 15,411.

This invention relates to the mounting of instruments on an instrument board and more particularly to the mounting of units in which are combined a plurality of indicating mechanisms or controls adapted to disclose and control the working conditions of various elements of an automobile.

An object of the invention is to provide a single assembly of several instruments which can be attached to another instrument for securing them to the instrument board or dash of an automobile.

In the form shown in the drawings, the instruments are secured to two plates which are held in position on the back of the instrument board by a bracket attached to an instrument, shown as the speedometer, said speedometer extending through and engaging the opposite face of the instrument board.

The above and other objects and features of the invention will be apparent from the following description of the illustrated embodiment shown in the accompanying drawings, in which:

Figure 4 is a rear view of the instrument board showing the instruments mounted thereon;

Figure 5 is a sectional view on line 5—5 of Figure 4; and

Figure 6 is a sectional view on line 6—6 of Figure 4.

Figure 1:
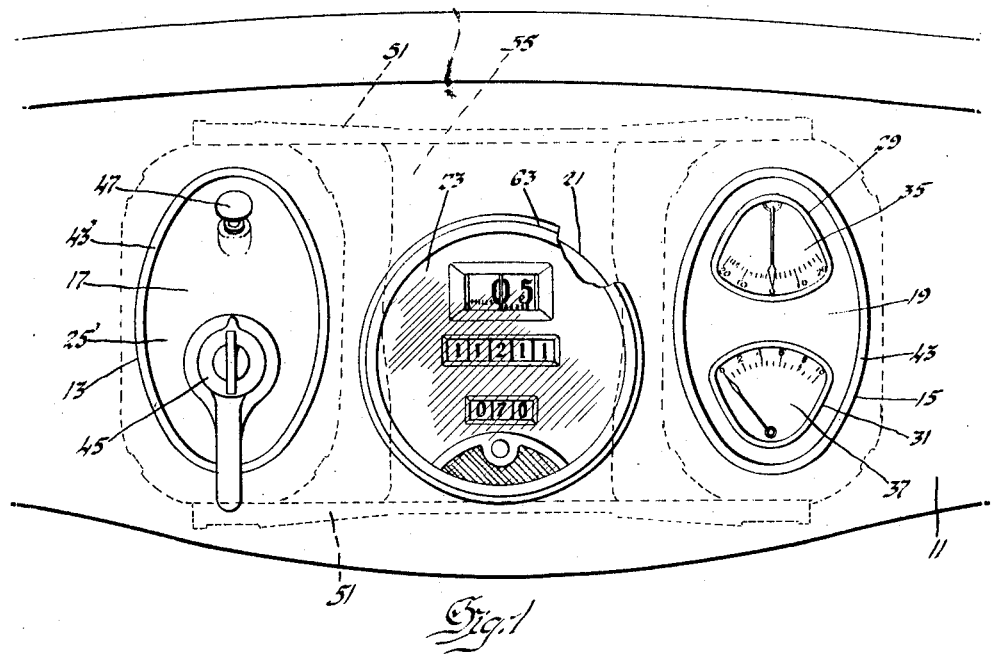
Figure 1 is a front view of the instrument board showing the instruments mounted thereon.

Referring to the drawings illustrating one practical embodiment of my invention and particularly to Figure 1, the instrument board 11 is shown provided with openings 13 and 15 adapted to receive the assembled instrument units 17 and 19. Another opening 21 is adapted to receive the instrument 23, shown as a speedometer.

Figures 2, 3:
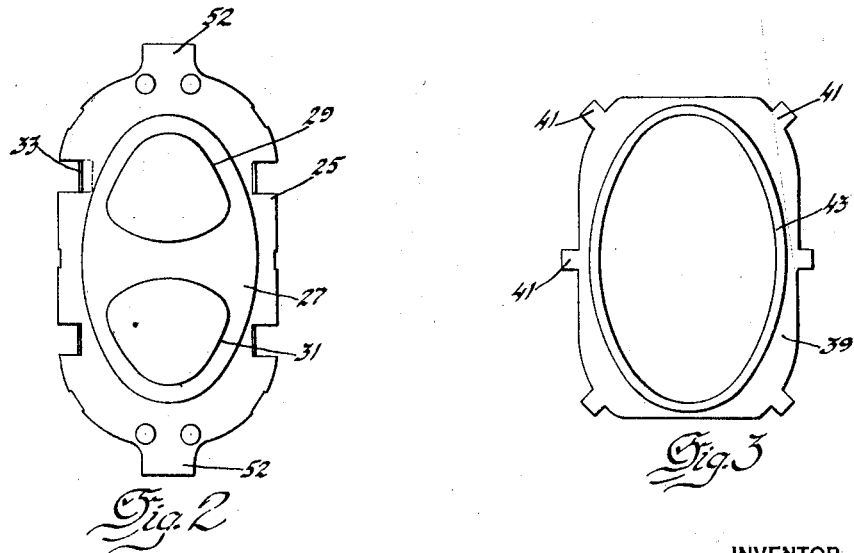
Figure 2 is a detail of the plate to which the instruments are attached.
Figure 3 is a detail of the bezel plate.

An instrument plate 25, shown in Figure 2, is provided with a depressed portion 27 and openings 29 and 31. Clips 33, shown as stamped out from the body portion of the plate, secure the instruments, such as an ammeter 35 and oil gage 37, to said plate in such a manner that their face is visible through the respective openings 29 and 31.

A bezel plate 39, shown in Figure 3, is preferably nickel plated and when attached to the instrument plate 25, by means of the clips 41, a neat appearing construction is obtained. The instrument plate 25 is preferably finished in black enamel and when the nickel plated bezel plate is attached thereto the same appearance is obtained as when the bezel 43 is formed on the face plate and the center portion carefully enameled leaving the bezel nickel plated. It has been found that the method of attaching the bezel to the face plate in this manner, for the purpose of contrast, is less expensive than the usual method of enamelling the center within the bezel. It will be understood that various contrasts other than the black enamel and nickel plating might be used.

A switch 45 and choke 47 are mounted on a plate 25' which is similar to the plate 25 with the exception that the center is adapted to receive the switch and choke. A bezel plate 39' is applied to the front face of the plate 25' in the same manner as the same plate 39 is applied to the plate 25, above described.

The instrument plate 25, instruments 35 and 37 and bezel plate 39, when assembled, form the instrument unit 19; and the plate 25', switch 45, choke 47, and bezel 39' form the instrument unit 17. These two units are attached between and at the ends of two parallel clamp bars 51 by means of bent clips 52 on the plates 25 and 25'. A U-shaped bracket 55 is attached to the center of the clamp bars 51 and is provided with slots 57 and an opening 59 to receive an extension 61 of the speedometer through which the drive shaft extends. The two bars and the U-shaped bracket form a frame construction which secures the instruments to the instrument board.

It will be noted that the construction thus far described comprises a unit consisting of the instrument units 17 and 19, clamp bars 51, and bracket 55, which is all bench assembly and one which can be readily mounted on the instrument board. In mounting the instruments, the speedometer 23 is inserted from the front of the instrument board through the opening 21. A flange 63 on the speedometer engages the front face of the instrument board and forms an abutment for determining the position thereof. The instrument unit is then placed on the back of the instrument board in such a manner that the two bezels enter the openings 13 and 15. Screws 65 on the speedometer enter the slots 57 and the nuts 67 engage the outer face of the bracket 55 holding the assembled unit and speedometer in position on the instrument board.

While one illustrative embodiment of my invention has been described in detail, it is not my intention to limit its scope to that particular embodiment shown except as indicated by the appended claims.

What I claim is:

1. In combination, a frame, a plurality of instruments carried by said frame, an instrument board having openings therein, an instrument extending through one of said openings and having an abutment engaging one of the surfaces of said instrument board, and attaching means carried by said instrument, said frame engaging the opposite surface of said instrument board and being secured thereto by said attaching means.

2. In a device of the class described, an instrument board having a plurality of openings therein, a plurality of instruments adapted to be received in said openings from opposite sides of said instrument board, and means carried by one of said instruments for securing all of said instruments to said instrument board.

3. In a device of the class described, an instrument board, a plurality of instruments mounted on said instrument board, and means carried by one of said instruments for securing the other instruments to said instrument board.

4. In a device of the class described, an instrument board, a centrally displaced instrument mounted on said instrument board, two other instruments located one upon either side of said central instrument, and means carried by said instrument for securing said other instruments to said instrument board.

5. In a device of the class described, an instrument board, a frame comprising a bracket having upper and lower outwardly extending bars, instruments mounted at the ends of said bars, and means for attaching said frame to another instrument having an abutment engaging the opposite side of said instrument board.

6. In a device of the class described, an instrument board having openings therein, a frame comprising a bracket having outwardly extending arms, instruments mounted on said arms, an instrument having an abutment engaging one side of said instrument board and extending through one of said openings, and means for attaching said frame on the opposite side of said instrument board to said instrument.

7. An instrument assembly comprising an instrument board, a bracket adapted to be supported from said instrument board, separate face plates secured to each end of said bracket, an instrument secured to one side of each face plate, and a bezel plate secured to the opposite side of each face plate.

In testimony whereof I affix my signature.

ALBERT R. LEWELLEN.